(12) United States Patent
Martin (10) Patent No.: US 11,229,170 B2
(45) Date of Patent: Jan. 25, 2022

(54) HYDROPONIC GROWTH AND CUTTING METHOD AND DEVICE

(71) Applicant: Ivan Z. Martin, Richland, PA (US)

(72) Inventor: Ivan Z. Martin, Richland, PA (US)

( * ) Notice: Subject to any disclaimer, the term of this patent is extended or adjusted under 35 U.S.C. 154(b) by 0 days.

(21) Appl. No.: 17/227,436

(22) Filed: Apr. 12, 2021

(65) Prior Publication Data

US 2021/0321585 A1 Oct. 21, 2021

Related U.S. Application Data

(60) Provisional application No. 63/012,296, filed on Apr. 20, 2020.

(51) Int. Cl.
*A01G 31/04* (2006.01)
*A01G 7/04* (2006.01)
*A01D 57/06* (2006.01)

(52) U.S. Cl.
CPC .......... *A01G 31/042* (2013.01); *A01D 57/06* (2013.01); *A01G 7/045* (2013.01)

(58) Field of Classification Search
CPC .... A01G 31/042; A01G 31/06; A01G 31/046; A01G 31/047; A01G 7/045
See application file for complete search history.

(56) References Cited

U.S. PATENT DOCUMENTS

| | | | | |
|---|---|---|---|---|
| 1,821,119 A | * | 9/1931 | Sorensen | B65G 39/20 210/400 |
| 2,928,211 A | * | 3/1960 | Martin | A01G 31/06 47/60 |
| 3,133,727 A | * | 5/1964 | Luscombe | A01K 5/004 366/186 |
| 3,284,948 A | * | 11/1966 | Kyle | A01G 31/042 47/65 |
| 3,327,425 A | * | 6/1967 | Dosedla | A01G 31/042 47/60 |
| 3,425,158 A | | 2/1969 | Leslie | |
| 3,991,514 A | * | 11/1976 | Finck | A01G 31/06 47/61 |
| 5,073,401 A | | 12/1991 | Mohr | |
| 2014/0283452 A1 | * | 9/2014 | Dittman | A01G 31/02 47/62 R |
| 2015/0250115 A1 | * | 9/2015 | Pickell | A01G 31/042 47/62 R |
| 2018/0132441 A1 | | 5/2018 | Barlow et al. | |

FOREIGN PATENT DOCUMENTS

| | | |
|---|---|---|
| EP | 2540156 B1 | 3/2015 |
| FR | 2680078 A1 | 2/1993 |
| WO | 2017030524 A1 | 2/2017 |
| WO | WO 2017/030524 * | 2/2017 |

* cited by examiner

*Primary Examiner* — Thanh Pham
(74) *Attorney, Agent, or Firm* — Hilary J. Sumner (57) ABSTRACT

A method and apparatus for hydroponically growing seed and cutting grown plants into more easily digestible pieces. The method and apparatus comprising a seed delivery mechanism, advancing culture belts, at least two distinct environmental zones designed to promote ideal environments for the germination and growth of the seeds, irrigation and lighting systems, an optional recycling system for irrigation water, and a cutter assembly to cut grown plants as they advance into the cutter.

9 Claims, 6 Drawing Sheets

FIG. 6 ic GROWTH AND CUTTING METHOD AND DEVICE

CROSS REFERENCE TO RELATED APPLICATIONS

This application claims benefit of priority from U.S. Provisional Patent Application No. 63/012,296 of Ivan Z. Martin, filed Apr. 20, 2020, entitled HYDROPONIC GROWTH AND CUTTING SYSTEM, the entirety of which is incorporated herein by reference.

STATEMENT REGARDING FEDERALLY SPONSORED RESEARCH/DEVELOPMENT

Not Applicable

PARTIES TO A JOINT RESEARCH AGREEMENT

Not Applicable

REFERENCE TO SEQUENCE LISTING, TABLE OR COMPUTER PROGRAM

Not Applicable

FIELD OF THE INVENTION

The present invention pertains to a method and apparatus for growing, harvesting, and cutting plant matter using a hydroponic system.

BACKGROUND OF THE INVENTION

The present inventions relates to an apparatus for hydroponically growing, harvesting, and chopping plants. Hydroponics is a method of germinating and cultivating a variety of plants within a controlled, soilless environment. This method is particularly useful in supplementing animal diets with nutritious, fresh feed. Hydroponics provides an expedient means to grow high quality plants while using a minimal amount of material. Plants are typically grown on a support bed or within an inert root support medium. Nutrient-rich solution is periodically applied to the plants to provide nitrogen, phosphorous, potassium and other elements required for proper growth.

The atmosphere within a hydroponic growth environment are tightly regulated through the use of thermostats, heating units, irrigation systems, lights, air conditioning and air circulation systems. Seeds are typically placed in trays within the controlled atmosphere and removed when the desired plant growth has been achieved. Alternatively, seeds may be grown on a culture belt where the plants advance through an illuminated and irrigated growing zone. A bed of seeds is placed on the belt and periodically irrigated with a nutrient solution. Ideal moisture, humidity, and lighting conditions are generated within the hydroponic system allowing the seeds to germinate and develop. Drainage and environmental systems prevent excess moisture from accumulating on the plants, limiting fungal infection and decomposition of the plant structure. Plants are removed from the culture belt when the desired plant growth has been achieved.

Animal scientists believe that chopping feed into shorter lengths increases its digestibility, particularly in ruminants. Increased digestibility and absorption can lead to gains in livestock weight and an overall improvement in the quality of animal products such as dairy and eggs. One of the primary reasons that ruminants chew their cud is to create additional surface area on the food being digested. Bacteria adhere to the cellulose in the feed, breaking it down into more digestible components. Chopped material offers an increased surface area in which these bacteria can adhere. More bacteria on the plant matter leads to quicker digestion and subsequent absorption of material within the feed. The juice released during chopping is also known to be high in nutrients, further adding to the quality of the feed.

A number of inventors have designed hydroponic systems using automatically advancing culture belts. Chopping in these designs is not possible as the product is grown within a specialized tray or affixed to the culture belts using undesirable paper or adhesive materials. These designs also fail to provide the distinct environments required for optimal germination and seed growth and typically irrigate the top of the plants rather than their root structure.

Germinating seed thrives when placed in an atmosphere having high humidity and increased temperature. This same environment can result in decaying root structure or fungal infection once the seed has established and the plant begins its growth phase. Current hydroponic systems typically offer only one environmental zone to germinate and grow the seed; seed is therefore grown at the same humidity and temperature in both the germination and growth phases resulting in a substandard feed at the end of the growth cycle.

There is therefore a need in the art for a hydroponic growth and cutting system that allows plants to germinate without the aid of paper, adhesives, or trays in a high humidity and high temperature environment while promoting subsequent growth in an environment having more suitable and lower humidity and temperature levels. There is a further need for a system that offers an automated cutting process to increase digestion and absorption of the plant material as well as a system that irrigates plants both from the top of the plant and through the root structure.

BRIEF SUMMARY OF THE INVENTION

The present invention comprises a multi-tiered culture belt system that does not require a cellulose substrate, adhesive, mats, or specialized trays to cultivate the plant root system. The design further comprises a sluice for uniform seed depth and distribution, discrete cultivation environments for the germination and growth phases of the feed, a shoot and root watering system, a water filtration and recycling system, and an automated cutting mechanism for improved digestion of the final product.

A plurality of culture belts are supported by a system of struts and housed within a closed cabinet to maintain the desired growth environment. A flexible divider extends in a substantially perpendicular orientation, separating the germination area from the subsequent growth area. Distinct temperature and humidity levels may be maintained in these two cultivation zones by segregating the two areas with the divider. A higher temperature and humidity level are maintained during the germination phase using a climate control and air circulation system described more particularly below. Once the seeds have sprouted, a lower temperature and humidity level is provided to optimize growth and minimize decay and fungal infection of the growing plants. Each of these environments is controlled by an irrigation system and a climate control system comprised of two thermostats, at least one air conditioner, a water heater, and two water pumps.

The cabinet is insulated and equipped with several access panels for troubleshooting and maintenance purposes. One or more culture belts are arranged within the cabinet such that they are substantially parallel to one another. Seed is deposited on each culture belt using a seed supply and delivery mechanism. A timing system coordinates the lighting, irrigation and movement of each culture belt as they progress through the length of the hydroponic unit and proceed to the cutting mechanism as described in more detail below.

LIST OF REFERENCE NUMERALS

5 Hydroponic Unit
10 Culture Belt
15 Cabinet
25 Supply Hopper
30 Seed
35 Elevating Feed Screw System
40 Horizontal Feed Screw System
45 Blower
55 Seed Chute
60 Seed Leveling Sluice
65 Seed Gate
70 First End of Culture Belt
75 Base of Leveling Sluice
80 Germination Zone
85 Divider
90 Growth Zone
100 Air Conditioning Unit
105 Water Heating Unit
110 Water Pump
115 Irrigation System
120 Splash Guard
125 Float Valve
130 Germination Drainage Trough
135 Germination Drainage Container
138 Germination Irrigation Container
140 Growth Drainage Trough
145 Growth Drainage Container
148 Growth Irrigation Container
150 Liquid Filtration System
152 Drain
155 Waste Tank
160 Main Liquid Supply Tank
165 Lighting System
170 Cutter Frame
175 Right Vertical Rail
180 Left Vertical Rail
185 Discharge End of Culture Belt
188 Rollers
190 Cutter Drum Assembly
195 Cutter Knives
200 Drum Housing
205 Conveyor Drive Sprocket
210 Shaft/Longitudinal Axis of Cutter Drum Assembly
215 Sprocket and Chain Assembly
220 Drum Motor
225 Pulley
230 Belt
235 Irrigation Pump
240 Main Drive Chain
245 Linkage Bar
250 Main Drive Linkage
255 Roller Chain Assembly
260 Hoist Chain
265 Main Hoist Sprocket
270 Gearmotor for Hoisting
275 Leveling Gears
280 Counterweight

DETAILED DESCRIPTION OF THE INVENTION

Basic Overview of Operation

Figure 1:
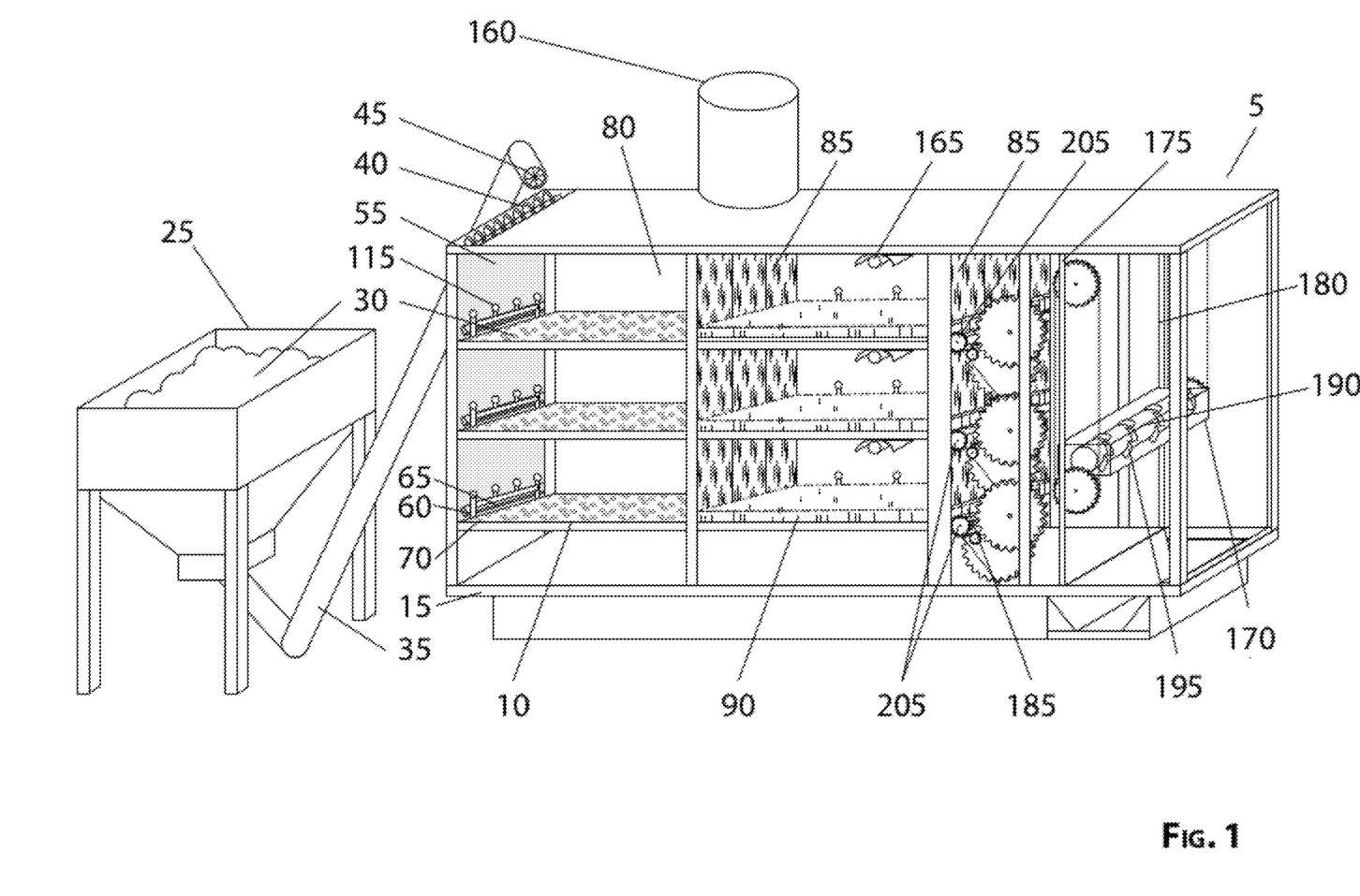
FIG. 1 is a perspective view of the front of the hydroponic unit and illustrates the cutter drum assembly without the drum housing.
Figure 2:
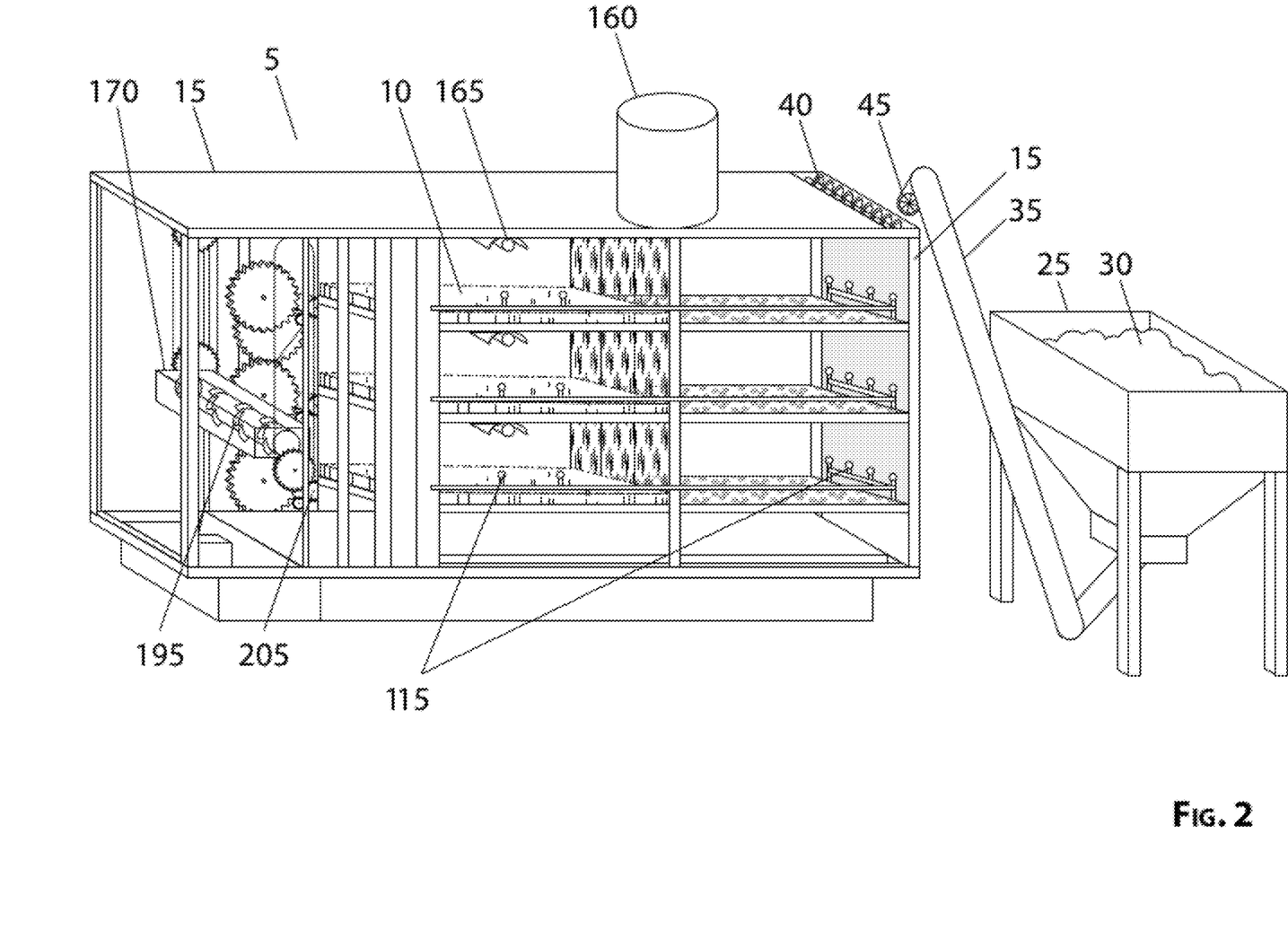
FIG. 2 is a perspective view of the rear of the hydroponic unit without the irrigation receptacles or air conditioning unit and further illustrating the cutter drum assembly without the drum housing.

Referring now to FIGS. 1 and 2, the hydroponic unit 5 is comprised of a plurality of looped culture belts 10 housed within a cabinet 15. One or more culture belts 10 are ideally arranged within the cabinet 15 such that they are substantially parallel to one another and slightly canted to allow for drainage. Each culture belt 10 is supported by multiple rollers and is connected to a conveyor drive sprocket 205. A timer electrically connected to the drum motor 220 (shown in FIG. 6) determines the selectable daily rate of advance for each culture belt 10 by regulating the power supplied to the cutter drum assembly 190. At the prescribed time each day, the timer which regulates the position of a relay switch, changes the position of that switch to deliver power to the drum motor 220. The drum motor 220 drives the cutter drum assembly 190 which is in turn designed to engage with the sprocket and chain assembly 215 associated with each culture belt 10 shown with more particularity in FIG. 5. Each sprocket and chain assembly 215 is engageably connected to conveyor drive sprocket 205 (illustrated in FIG. 1) which controls the progression of the corresponding culture belt 10 and coordinates the operation of the other systems within the unit 5. The cutter drum assembly 190 runs for a pre-determined time, allowing those plants at the discharge end 185 of the lowest level culture belt 10 to be chopped while simultaneously energizing the components of the seed delivery system such that seeds are deposited in the germination zone 80 of that culture belt 10 as depicted in FIG. 1. Plants within the growth zone 90 on that particular culture belt 10 concurrently advance laterally within the cabinet 15. At the end of the pre-determined time, the cutter drum assembly 190 disengages with the conveyor drive sprocket 205 of the lowest level culture belt 10 and proceeds to the next level of culture belts to repeat the process, chopping plants at the discharge end of that culture belt while simultaneously depositing seed and advancing sprouted seed in the germination zone 80 to the growth zone 90. This sequence recurs until plants at the discharge end 185 have been chopped and new seed 30 has been deposited on each level of culture belts 10 in the hydroponic unit 5. A sizable crop can usually be grown within a seven day interval; however, a curtailed growing period may be preferred if a shorter crop is desired or if faster growing seed is used. The specific operation of each area of the hydroponic unit 5 is described more fully below.

Seed Placement

Figure 3:
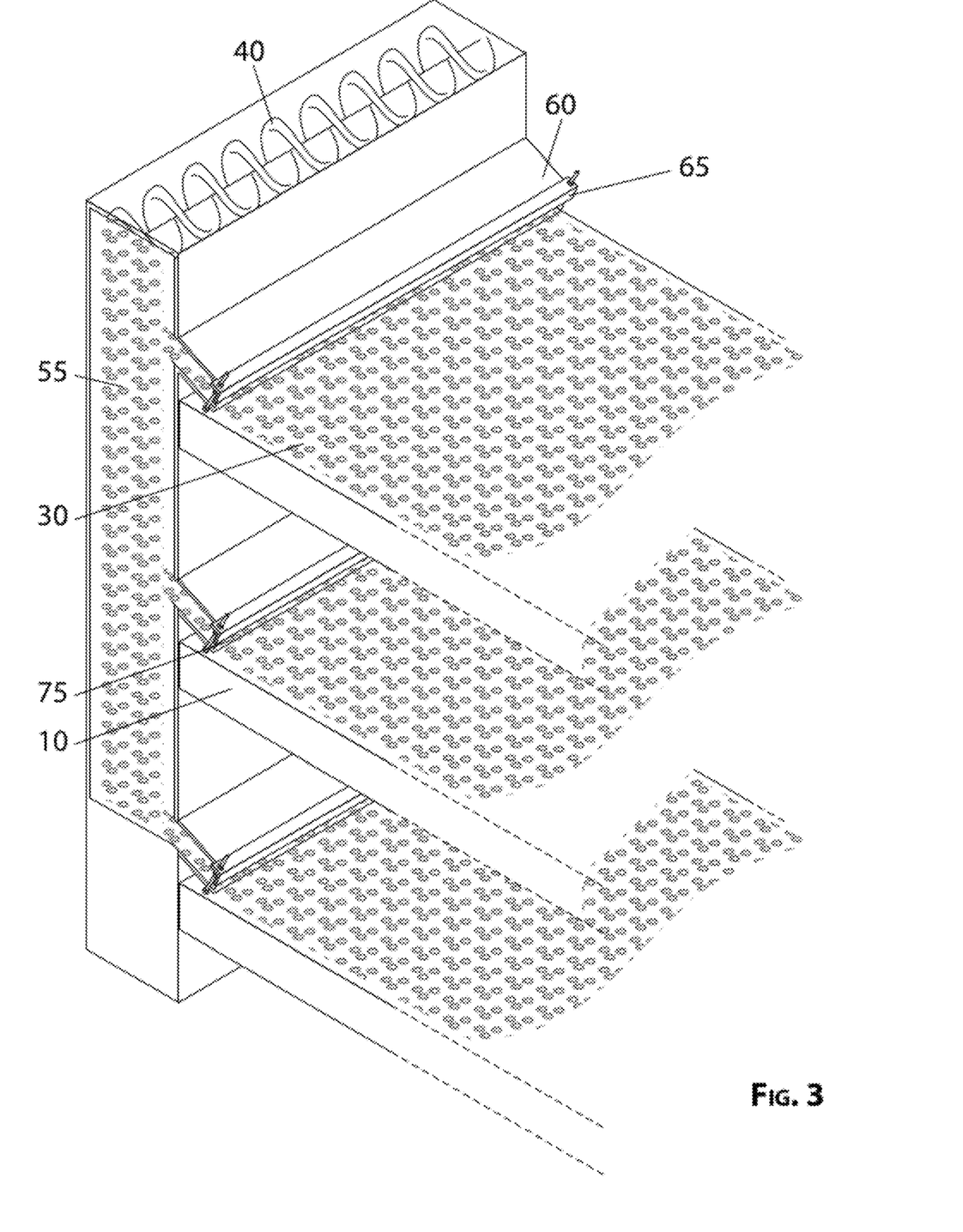
FIG. 3 is a perspective view of the seed chute, illustrating the seed gate and leveling sluice in more detail.
Figure 5:
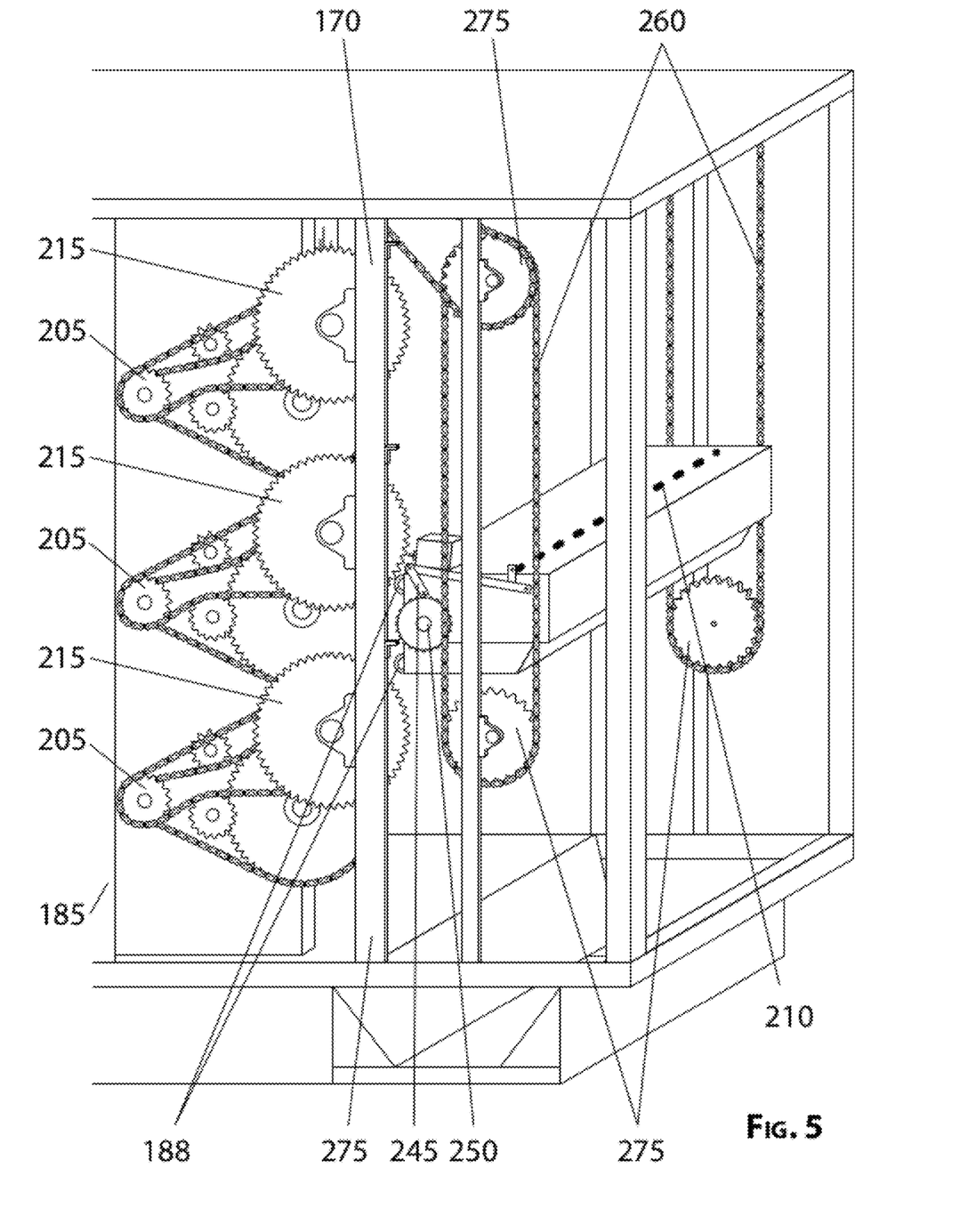
FIG. 5 is a front perspective view of the sprocket and chain assembly and cutter drum assembly.

A supply hopper 25 is filled with the desired seed 30 and delivers that seed 30 to an elevating feed screw system 35 as shown in FIGS. 1 and 2. In one embodiment, the elevating feed screw system 35 transports the seed to a horizontal feed screw system 40 comprised of an auger or similar advancing mechanism. An optional blower 45 blows the dust from the seed 30 within the horizontal feed screw system 40 as the seed 30 advances to a seed chute 55 above each of the culture belts 10. Each seed chute 55 extends substantially vertically along the first end 70 of the culture belts 10 and has openings (hereinafter seed gates 65) that correspond with the number of culture belts 10 (see FIG. 3). Referring again to FIG. 3, each seed gate 65 is positioned slightly above and adjacent to the first end 70 of each culture belt 10. The nominal width of both the seed chute 55 and seed gates 65 corresponds to the nominal width of the culture belts 10. Seed 30 entering the seed chute 55 falls vertically, gravity feeding seed 30 to each seed gate 65. The conveyor drive sprocket 205 of each culture belt 10, shown in FIG. 5, is designed to work in concert with the supply hopper 25, elevating feed screw system 35, and horizontal feed screw system 40 such that the culture belts 10 advance laterally as seed 30 is deposited. The base of a seed leveling sluice 60 located above the deposited seed 30 levels that seed 30 to a preferred depth as the culture belt 10 advances beneath it (see FIG. 3). The depth of the seed 30 on the culture belt 10 may be adjusted by loosening a set of thumb screws, illustrated in FIG. 3, to lower or raise the seed leveling sluice 60 to a preferred height and subsequently retightening those fasteners. It should be recognized that other fastening means may be used. Optional gate closures may also be added to each sluice 60. These closures prevent seed 30 from being deposited on one or more culture belts 10 if a smaller crop is desired.

Referring once again to FIGS. 1 and 2, in one embodiment, a flexible and moveable divider 85 separates the germination zone 80 from the growth zone 90 on each culture belt 10 as discussed in more depth below. The seeds 30 remain in the segregated germination zone 80 for a scheduled interval as determined by the operation of the drum motor 220 timer described above. During this stage, timed irrigation and lighting cycles coax the seeds to sprout. When the drum motor 220 re-energizes, each culture belt 10 level advances laterally in a sequential operation, delivering sprouted seeds through the divider 85 and into the growth zone 90.

Plant Growth, Lighting and Capacity

Illumination of the culture belts 10 may be determined by a selectably timed lighting sequence to optimize germination and growth of the plants. One or more lights in the lighting system 165 positioned within the cabinet 15 may stay on indefinitely or they may be adjusted to suit the particular lighting requirements of the crop (see FIGS. 1 and 2). As described in the basic operation section above, each day a timer regulates the position of a relay switch that delivers power to the drum motor 220. The engagement between the sprocket and chain assembly 215 of each culture belt 10 and the conveyor drive sprocket 205 shown in FIG. 5 controls the lateral progression of the corresponding culture belt 10. The number of growth positions within the hydroponic unit 5 corresponds to the number of days in the selected growth cycle less one. For instance, if a seven day growth period is selected, there will be one germination station and six growth stations in the cycle. If a larger capacity is needed, longer culture belts 10 with corresponding germination 80 and growth zones 90 may be added to accommodate additional seed 30. FIGS. 1-6 illustrate a hydroponic unit 5 having three levels but it should be recognized that the number of culture belt 10 levels may be increased or decreased to suit a particular production need.

Atmosphere Regulation

As previously discussed, the atmosphere in the hydroponic unit 5 is tightly controlled within both the germination zone 80 and growth zone 90. It should be noted that an optional second divider 85 may be added at the end of the growth zone to maintain heat and humidity levels in that area as shown in FIG. 1.

A thermostat, or similar temperature controlling device, is positioned within the germination zone 80 wherein a desired temperature is set. This thermostat is electrically engaged with a water heating unit 105 and a water pump 110 shown in FIG. 4. When the temperature within the germination zone 80 falls below the thermostat set point, the water pump 110 is energized, delivering hot water from the water heating unit 105 to a heating coil within the germination zone 80 to warm the area. Once the temperature reaches the desired set temperature, the water pump 110 deenergizes to stop the flow of hot water to the heating coil. It should be recognized that other heating means may be used to warm the area such as electrical or gas units.

Referring again to FIG. 4, a second thermostat is positioned within the growth zone 90. This second thermostat, equipped with adjustable upper and lower temperature limits, is electrically engaged with a climate control system. The climate control system is comprised of an air conditioning unit 100, the water heating unit 105 and the water pump 110 illustrated in FIG. 4. The inventor contemplates placement of air conditioning unit 100 on or near the frame 15 of the hydroponic unit 5 and connected to the growth zone 90 via one or more pipes or conduits. It should be recognized that the various components of the climate control system may be placed elsewhere provided that the unit maintains a modicum of efficiency.

Figure 4:
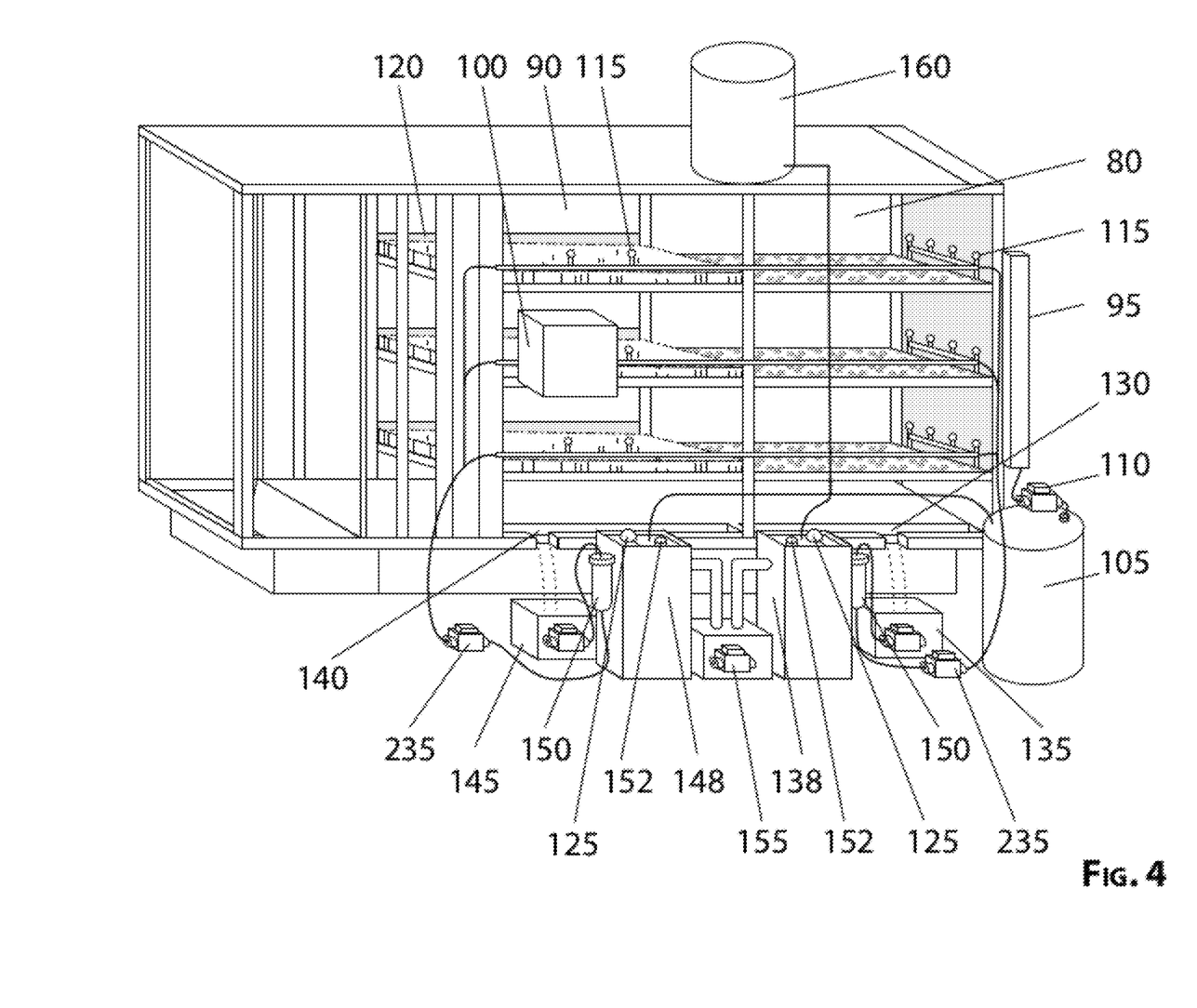
FIG. 4 is a perspective view of the rear of the hydroponic unit showing the irrigation receptacles, water heater and air conditioning unit as well as the splash guard.

The fan within the air conditioning unit 100, depicted in FIG. 4, will ideally operate at all times to circulate air within the growth zone 90. If the thermostat detects a temperature that falls outside the upper or lower temperature limits, a microswitch connected to the thermostat sends electricity either to the compressor within the air conditioning unit 100 (to cool the zone) or to the water pump 110, thereby delivering hot water from the water heating unit 105 to a heating coil (to warm the zone). Fans within the air conditioning unit 100 assist in distributing cold or warmed air within the growth zone 90. The microswitch disengages power to the compressor or water pump 110, as applicable, once the temperature falls within the desired range.

Irrigation cycles and air conditioner settings may be also adjusted to achieve the desired humidity levels in each zone.

Timed irrigation from a water fogger or similar liquid delivery device provides moisture and optionally, dissolved fertilizer to the plants in both the germination 80 and growth zones 90. Typically seeds 30 in the germination zone 80 are watered once an hour for a few minutes at a time. Sprouted seeds 30 in the growth zone 90 are generally watered once every five hours for a few minutes at a time. Liquid from the irrigation system 115 is delivered above the plants. The culture belts 10 may be slightly canted and equipped with an optional splash guard 120 (see FIG. 4) to direct and facilitate the flow of liquid by gravity through the plant root system. The specific direction of the cant is not critical, provided that the liquid is directed and flows along the surface area of the culture belt 10 and drains into a trough where it may be recycled by the watering system as described more fully below.

Liquid Supply, Recycling, and Filtration

Referring once again to FIG. 4, one embodiment includes a liquid recycling system comprised of a plurality of vessels, drainage channels, and at least two sets of troughs. Liquid within the germination drainage trough 130, located at the base of the germination zone 80, drains into the germination irrigation container 138. A float valve 125 within the germination irrigation container 138 controls a pump within the germination drainage container 135, pushing the water through a liquid filtration system 150 and storing that liquid in the germination irrigation container 138 until the next irrigation cycle. As previously noted and further depicted in FIG. 2, water is provided by an irrigation system 115 positioned above the seeds; the cant of the belt 10 directs water through the plant root system. Excess moisture drains though a plurality of channels where it collects in the germination drainage trough 130 and continues to the germination drainage container 135 where the liquid may be recycled for the next irrigation period as described below. The main liquid supply tank 160 provides additional water as needed (see FIGS. 2 and 4).

Referring again to FIG. 4, liquid within the growth drainage trough 140, located at the base of the growth zone 90, similarly drains into the growth drainage container 145. A float valve 125 within the growth irrigation container 148 controls a pump within growth drainage container 145, pushing liquid through a liquid filtration system 150 and storing that water in the growth irrigation container 148 until the next irrigation cycle. As noted above, irrigation is directed primarily to the plant leaves; however, a small amount of spray may be directed to the splash guard 120 located adjacent to the highest point of elevation of the canted culture belt 10. Water collects at the base of this splash guard 120 and drains beneath the plants, watering them from below. The dual irrigation system waters both the roots and leaves to provide ideal moisture to the plants. It should be noted that any water soluble material may be added to irrigation containers 138 and 148 such as fertilizers or fungicides that may aid in the growth and overall health of the plants. Because these irrigation containers 138 and 148 offer individual liquids, the specific additives can be customized to suit the germination zone 80 and growths zone 90 of the unit 5.

A main liquid supply tank 160 maintains a minimum liquid level within the water heating unit 105 and irrigation containers 138 and 148. Referring to FIG. 4, this tank 160 is located at the top of the hydroponic unit 5, using gravity to assist in maintaining the appropriate water levels. It should be recognized that other means including floor level reservoirs and pumps may be used instead.

A lightweight waxy coating covering the seed 30 is often dislodged during irrigation. This material floats on the surface of the irrigation containers 138 and 148. An optional drain 152 is positioned within each irrigation container 138 and 148 at the water surface. Movement of the water within the irrigation containers 138 and 148 forces the waxy seed coating to float into this drain where it is directed to a waste tank 155. This waste tank 155 is equipped with a float assembly that controls the operation of a pump. When the waste tank 155 reaches the level set by the float assembly, the pump energizes and transfers waste material to a discharge receptacle where it is discarded. It should be recognized that other means of regulating and moving the waste liquid may be used.

Cutting Mechanism

Figure 6:
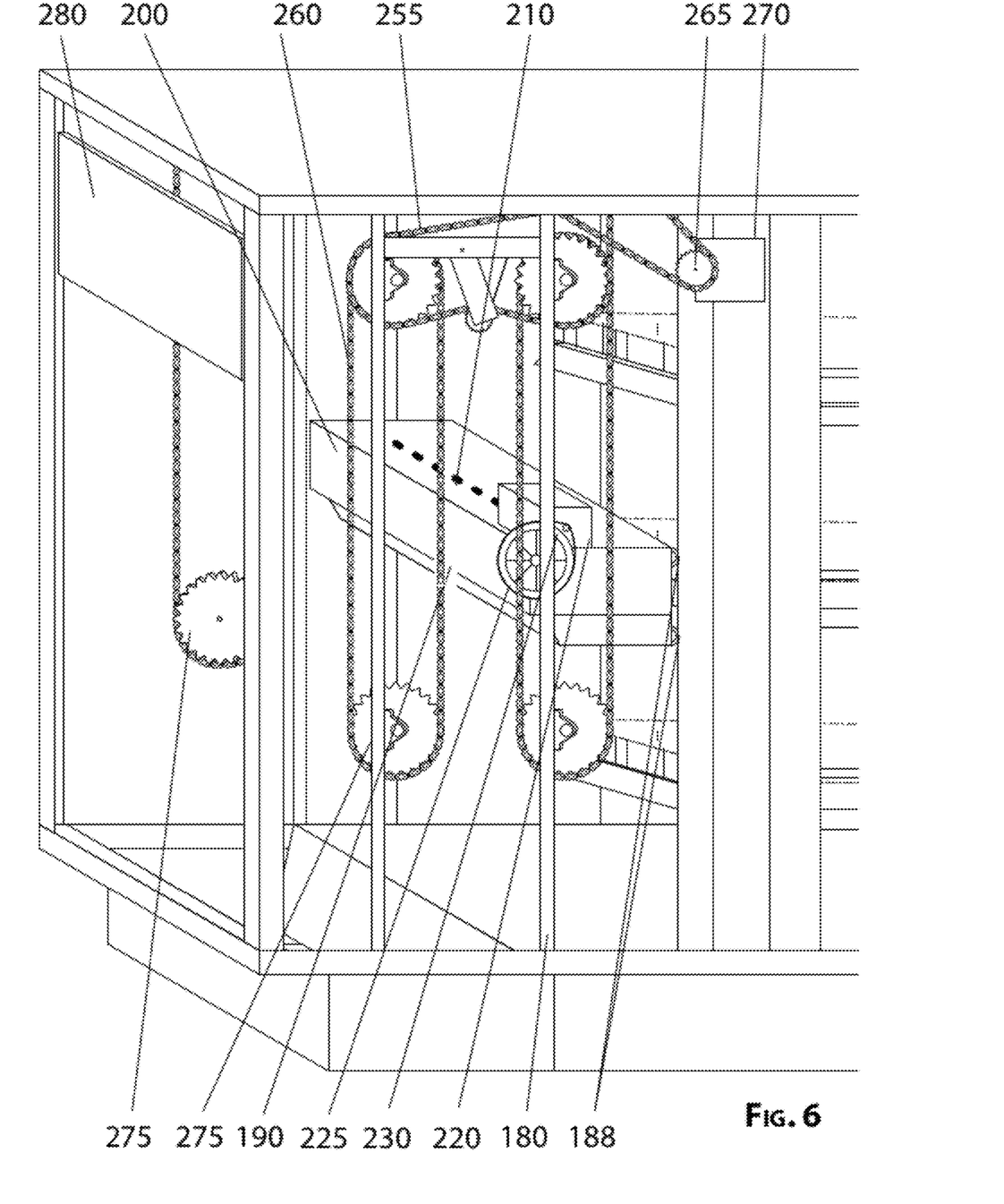
FIG. 6 is a rear perspective view of the sprocket and chain assembly and cutter drum assembly.

Once the plants have reached the end of the selected growth cycle the plants are chopped into smaller and more easily digestible pieces. Referring now to FIG. 2, a cutter frame 170 having two ends is mounted on a right vertical rail 175 and left vertical rail 180 near the discharge end 185 of the culture belt 10 as illustrated in FIGS. 1, 5 and 6. Multiple sets of rollers 188 (shown in FIG. 6) are used to mount the cutter frame 170 to the rails, 175 and 180 such that the cutter frame 170 can move vertically along these rails.

One embodiment uses four sets of rollers 188 wherein one set of rollers 188 is mounted on each corner of the cutter frame 170. Each roller set is comprised of two ball bearings wherein one ball bearing is mounted on either side of each rail, 175 and 180. It should be recognized that alternative designs may be used, provided that the cutter frame 170 is securely coupled to the rails 175 and 180 such that it does not contact the culture belt 10 and can move vertically along these vertical rails 175 and 180. Each rail also has a set of disengagement voids that allow the cutter drum assembly 190 to disengage with and retract from the rails 175 and 180.

Referring now to FIGS. 1, 2, 5 and 6, the cutter frame 170 houses an appropriately sized cutter drum assembly 190 having a set of cutter knives 195 about its outer circumferential surface and a nominal width that corresponds to the width of each culture belt 10. A drum housing 200 (illustrated in FIG. 6) may be used to cover the cutter knives 195 to prevent injury. The cutter drum assembly 190 is mounted within the cutter frame 170 along its longitudinal axis such that it will not strike the frame 170 or culture belt 10 when rotating.

Each hydroponic unit 5 is equipped with a number of identical sprocket and chain assemblies 215 corresponding with the number of culture belts 10 in the unit. FIGS. 1 and 5 illustrate three sets of speed reducing sprocket and chain assemblies 215 corresponding to the three culture belts 10 on that particular unit 5. It should be understood that additional or fewer culture belts 10 and corresponding sprocket and chain assemblies 215 may be used.

Each sprocket and chain assembly 215 is connected to the conveyor drive sprocket 205 and is comprised of a set of gears as illustrated in FIG. 5. As described in the basic operation section, a timer electrically connected to the drum motor 220 (shown in FIG. 6) determines the selectable daily rate of advance for each culture belt 10. At the prescribed time each day, the timer regulates the position of a relay switch that delivers power to the drum motor 220. The drum motor 220 drives the cutter drum assembly 190 which engages with the sprocket and chain assembly 215 associated with each culture belt 10.

A main drive chain 240 is mechanically engaged with and encircles the conveyor drive sprocket 205 and continues around the corresponding sprocket and chain assembly 215 for each culture belt, synchronizing the motion of the culture belts 10 with the rotation of the cutter drum assembly 190 as described more fully below. In the present invention, depicted in FIG. 5, each sprocket and chain assembly 215 is mounted along a vertical rail adjacent to the discharge end 185 of the culture belts 10 and on the same side of the unit 5 as the conveyor drive sprocket 205. The level at which each individual culture belt 10 is positioned will determine the relative vertical mounting position of each sprocket and chain assembly 215.

In order minimize the amount of machinery required to cut the feed, the vertically mobile cutter drum assembly 190 is positioned at the discharge end 185 of the culture belts 10 and moves along the vertical (or y-axis) to engage with each culture belt 10 level. The cutter drum assembly 190 has a shaft along its longitudinal axis 210 (see FIG. 5) that engages with the sprocket and chain assembly 215 on its first end through a main drive linkage 250 and mechanically connects to the drum motor 220 on its second end. Referring to FIG. 6, the drum motor 220 is mounted to a pulley 225, via a belt 230. When energized, the motion of the drum motor 220 translates to rotation of the second end of the shaft 210, resulting in the rotation of the cutter drum assembly 190 and cutter knives 195 mounted on it. The cutter drum assembly 190 may rotate toward the culture belt 10 or alternatively, away from it; however, the cutting operation is more efficient if the cutter drum assembly 190 rotates away from the culture belt 10. An optional governor may be added to the drum motor assembly to deenergize the motor if the assembly is running too slowly or if it is jammed.

Turning once again to FIG. 5, a timing mechanism controls the operation of a linkage bar 245 that propels the main drive linkage 250 forward such that it engages with the sprocket and chain assembly 215 of a given culture belt 10. Once engaged, the rotation of the cutter drum assembly 190 synchronizes and controls the motion of the culture belt 10; plants on the belt feed into the cutting mechanism where they are cut into smaller pieces and drop into a tray or conveyor beneath the unit.

Because only one cutter drum assembly 190 is used, this assembly 190 is raised and lowered to engaged with the various culture belts 10 on the unit 5. The height of the cutter drum assembly 190 is controlled by the roller chain assembly 255 as depicted in FIGS. 5 and 6. The roller chain assembly 255 is comprised of a set of hoist chains 260, a main hoist sprocket 265, a gearmotor for hoisting 270 and a set of leveling gears 275. The leveling gears 275 are arranged near the cutter drum assembly 190 and the cutter frame 170 as depicted in FIG. 6 and are required to maintain the cutter drum assembly 190 in a substantially horizontal position. When the hoist chains 260 are connected about these leveling gears 275 as shown in FIG. 6, the cutter drum assembly 190 is supported by those chains such that it can raise and lower on the frame 170, as the rollers 188 move along the rails 175 and 180 with a minimal amount of torque or lateral movement. A counterweight 280, also shown in FIG. 6, may also be added to offset the weight of the cutter drum assembly 190, thereby reducing the stress to the roller chain assembly 255. An optional governor may be added to the hoist motor and chain assembly to deenergize the motor if that assembly is running too slowly or if it is jammed.

A first set of hoist chains 260 engages with the main hoist sprocket 265 and encircles a set of leveling gears 275 at the second end of the shaft 210 as depicted in FIG. 6. A second set of hoist chains 260, located at the first end of the shaft 210, engages with and encircles another set of leveling gears 275 also located at the first end of the shaft 210. The vertical portion of the hoist chain 260 is equipped with a special attachment link that engages with the cutter frame 170. When the link is engaged with the cutter frame 170 and the gearmotor for hoisting 270 is energized, the cutter drum assembly 190 advances vertically along the y-axis of rails 175 and 180.

Cutting Operation

To initiate the cutting cycle, the operator energizes a solenoid and a main relay timer by operating a push button switch. This main relay timer regulates current to the drum motor 220 and subsequent rotation of the cutter drum assembly 190 as described above. The main relay timer also controls a secondary timer that regulates the motion of a linkage bar which regulates the engagement between the cutter drum assembly 190 and the sprocket and chain assemblies 215 for each culture belt 10 and places the cutter drum assembly 190 on the vertical track.

The cutting cycle will generally begin at the lowest culture belt 10 on the unit 5. When the cutting cycle initiates, a linkage bar 245 will force the main drive linkage 250 to move in a forward and upward motion such that it engages with the applicable sprocket and chain assembly 215 while simultaneously causing the rollers 188 of the cutter drum assembly 190 to engage with the right and left vertical rails 175 and 180. See FIGS. 5 and 6.

Once the cutter drum assembly 190 has engaged with the applicable sprocket and chain assembly 215, the culture belt 10 advances, driving the mat of growth through the optional second divider 85, depicted in FIG. 1, into the cutter drum assembly 190 where the plants are cut into smaller and more digestible pieces by the cutter knives 195. Once that length of crop has been chopped, the main drive linkage 250 disengages with that particular sprocket and chain assembly 215 and the roller chain assembly 255 elevates the cutter drum assembly 190 to the next culture belt 10 level where the cutter drum assembly 190 engages with the corresponding sprocket and chain assembly 215. This cycle repeats until all crops have been chopped on all culture belt 10 levels. The cut crops drop into a receptacle at the base of the unit 5 where they can be removed. Alternatively, a conveyor may be placed at the base of the unit 5, delivering cut crops to a desired area.

At the end of the cycle, the roller chain assembly 255 pulls the cutter drum assembly 190 in an outward and downward motion, withdrawing it from the right and left vertical rails 175 and 180 at the disengagement voids on the rails, 175 and 180, and returning the cutter drum assembly 190 to the base of the hydroponic unit 5.

While the above description contains many specifics, these should be considered exemplifications of one or more embodiments rather than limitations on the scope of the invention. As previously discussed, many variations are possible and the scope of the invention should not be restricted by the examples illustrated herein.

The invention claimed is:

1. An automated hydroponic seed growth and cutting system for growing plants having leaves and roots, the automated hydroponic seed growth and cutting system comprising:

a cabinet having an interior and at least one divider within said interior, wherein said cabinet interior is isolated from the ambient environment thereby creating a germination zone and a seed growth zone wherein each of said zones has a distinct growing environment;

a climate control system comprised of an air conditioning unit, a water heating unit, and water pump for controlling the temperature, humidity, and air flow within the germination zone and seed growth zone;

a germination zone thermostat connected to the climate control system and located within the germination zone;

a seed growth thermostat connected to the climate control system and located within the seed growth zone;

at least one looped belt for conveying seed, wherein said looped belt is supported by a plurality of rollers within the cabinet interior and connected to a corresponding conveyor drive sprocket;

a seed delivery system comprised of a hopper, an elevating feed screw, and a horizontal feed screw, wherein said seed delivery system is mechanically engaged with and energized through movement of the looped belt;

at least one gravity-fed seed chute having two ends including a feed screw end and a seed delivery end, wherein the gravity-fed seed chute is attached to the horizontal feed screw at the feed screw end and to a seed delivery gate at the seed delivery end, wherein each gravity-fed seed chute is positioned above a corresponding looped belt for depositing a desired depth of seed directly on said corresponding looped belt wherein seeds from the hopper are transported by the elevating feed screw to the horizontal feed screw, wherein the seeds from the horizontal feed screw are supplied to the at least one gravity-fed seed chute to be deposited on said corresponding looped belt;

at least one liquid delivery device positioned above each looped belt to facilitate irrigation;

at least one light source positioned above each looped belt to facilitate photosynthesis;

a growth period timer for selecting a desired growth period and corresponding rate of advancement of the at least one looped belt;

a cutter drum assembly comprised of a plurality of cutter knives, wherein the cutter drum assembly is mounted within the cabinet interior such that it moves vertically within said interior; and at least one motor electrically connected to said growth period timer and configured to periodically deliver power to the cutter drum assembly to rotate said cutter knives and sequentially engage and disengage the cutter drum assembly with each of the conveyor drive sprockets through a geared mechanism for a set period of time controlled by said growth period timer, the engagement of said cutter drum assembly with said conveyor drive sprocket thereby driving the corresponding looped belt to energize the seed delivery system, to advance sprouted seed within the cabinet, and to direct a length of grown plant matter to the cutter drum assembly.

2. The automated hydroponic seed growth and cutting system of claim 1, wherein the at least one looped belt is canted to facilitate the delivery of liquid to the plant roots.

3. The automated hydroponic seed growth and cutting system of claim 1 further comprising a splash guard mounted adjacent to said at least one looped belt to facilitate the delivery of liquid to the plant roots.

4. The automated hydroponic seed growth and cutting system of claim 1 further comprising at least one trough, at least one liquid storage receptacle, at least one filtration unit, and at least one pump for capturing runoff liquid and directing it to the at least one liquid delivery device and for introducing fertilizers and fungicides to said liquid to enhance plant growth and health.

5. The automated hydroponic seed growth and cutting system of claim 1 wherein the seed delivery gate further comprises an adjustable seed leveling sluice for setting a desired level seed depth.

6. The automated hydroponic seed growth and cutting system of claim 1 further comprising a liquid delivery timer to control delivery of liquid from the at least one liquid delivery device.

7. The automated hydroponic seed growth and cutting system of claim 1 further comprising an illumination timer to control illumination from the at least one light source.

8. The automated hydroponic seed growth and cutting system of claim 1 wherein the horizontal feed screw further comprises a blower to remove dust and particulate from the seeds.

9. The automated hydroponic seed growth and cutting system of claim 1 further comprising a conveyor positioned beneath the cutter drum assembly.

* * * * *